(12) United States Patent
Freeny, Jr.

(10) Patent No.: US 6,594,643 B1
(45) Date of Patent: Jul. 15, 2003

(54) AUTOMATIC STOCK TRADING SYSTEM

(76) Inventor: Charles C. Freeny, Jr., 414 Oak View, Grand Prairie, TX (US) 75050

(*) Notice: Subject to any disclaimer, the term of this patent is extended or adjusted under 35 U.S.C. 154(b) by 0 days.

(21) Appl. No.: 09/451,643

(22) Filed: Nov. 30, 1999

Related U.S. Application Data

(63) Continuation-in-part of application No. 08/970,769, filed on Nov. 14, 1997, now abandoned.

(51) Int. Cl.[7] .............................................. G06F 17/60
(52) U.S. Cl. .......................................... 705/37; 705/36
(58) Field of Search ............................... 705/35, 36, 37

(56) References Cited

U.S. PATENT DOCUMENTS

| | | | |
|---|---|---|---|
| 4,412,287 A | 10/1983 | Braddock, III | 705/37 |
| 4,674,044 A | 6/1987 | Kalmus et al. | 705/37 |
| 4,677,933 A * | 7/1987 | Rotella | 116/313 |
| 4,903,201 A | 2/1990 | Wagner | 705/37 |
| 5,101,353 A * | 3/1992 | Lupien et al. | 705/37 |
| 5,444,819 A | 8/1995 | Negishi | 706/21 |
| 5,508,913 A | 4/1996 | Yamamoto et al. | 705/37 |
| 5,717,989 A | 2/1998 | Tozzoli et al. | 705/37 |
| 5,732,397 A | 3/1998 | DeTore et al. | 705/1 |
| 5,745,706 A | 4/1998 | Wolfberg et al. | 705/35 |
| 5,799,289 A | 8/1998 | Fukushima et al. | 705/400 |
| 5,812,987 A | 9/1998 | Luskin et al. | 705/36 |
| 5,819,238 A | 10/1998 | Fernholz | 705/36 |
| 5,845,266 A | 12/1998 | Lupien et al. | 705/37 |
| 6,134,535 A * | 10/2000 | Belzberg | 705/37 |
| 6,188,992 B1 * | 2/2001 | French | 705/35 |
| 6,317,728 B1 * | 11/2001 | Kane | 705/37 |
| 6,401,080 B1 * | 6/2002 | Bigus et al. | 705/37 |
| 6,405,180 B2 * | 6/2002 | Tilfors et al. | 705/37 |
| 6,418,417 B1 * | 7/2002 | Corby et al. | 705/35 |
| 6,418,419 B1 * | 7/2002 | Nieboer et al. | 705/37 |
| 6,421,653 B1 * | 7/2002 | May | 705/37 |

FOREIGN PATENT DOCUMENTS

| | | |
|---|---|---|
| EP | 0 401 203 A2 | 5/1990 |
| WO | WO 95/26005 | 9/1995 |
| WO | WO 97/22075 | 6/1997 |

OTHER PUBLICATIONS

Morgam, J., "Smart Money Stop–Loss Orders Aren't Risk – Free," Newsday Nassau and Suffolk edition, Wednesday, Oct. 11, 1989, p. 53.*

(List continued on next page.)

Primary Examiner—Nicholas David Rosen
(74) Attorney, Agent, or Firm—Dunlap, Codding & Rogers, P.C.

(57) ABSTRACT

The present invention relates to a system for automatically trading real investment items desirably on at least one trading exchange based on predetermined conditions. The present invention includes a data interface for receiving investment data identifying at least one item capable of being traded and containing information uniquely associated with the item. An individual trading computer receives predetermined trading criteria for making a trade. The individual trading computer receives the investment data and the predetermined trading criteria. The individual trading computer then analyzes the investment data with the trading criteria and outputs a trade request signal desirably with no manual intervention in response to the analysis determining that the item should be traded. The trade request signal identifies at least one trade of the item to be made by a trader and authorizes the trader to make the trade identified in the trade request so that at least a portion of the trade identified in the trade request signal can be consummated.

4 Claims, 3 Drawing Sheets

OTHER PUBLICATIONS

Fridrich, W.L., "When to Get in, when to Get out," Lotus, vol. 5, No. 10, p. 32, Oct. 1989.*

AAii American Association of Individual Investors; "Computerized Investing"; Jul./Aug. 2000; vol. XIX, No. 4; pp. 1–27.

The Wall Street Journal, Tuesday, Jun. 2, 1998, "Why Wall Street Firms Trail in On–Line Battle" (2 pages).

The Wall Street Journal, (date unknown) Tense Exchange: "Big Board's Members Face Off on the Issue of Automated Trading".

* cited by examiner

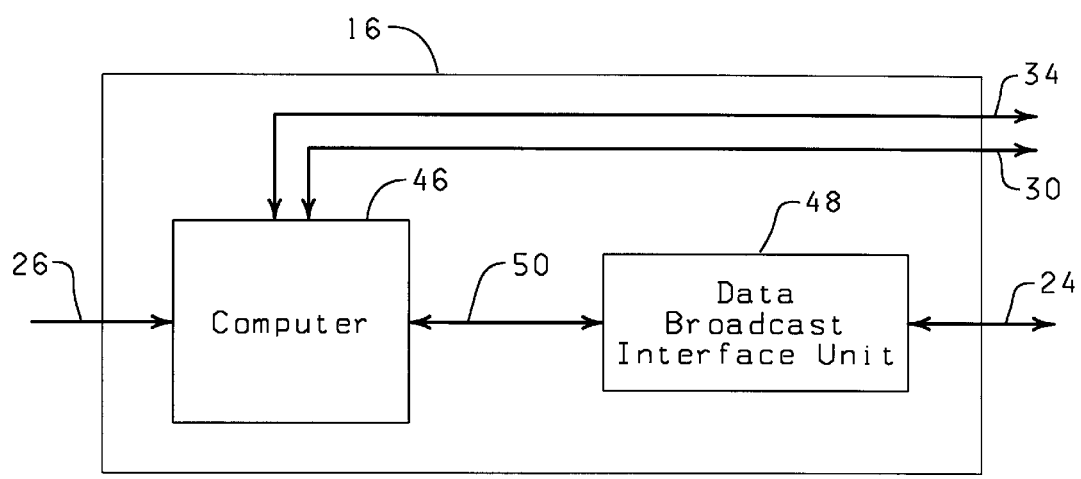
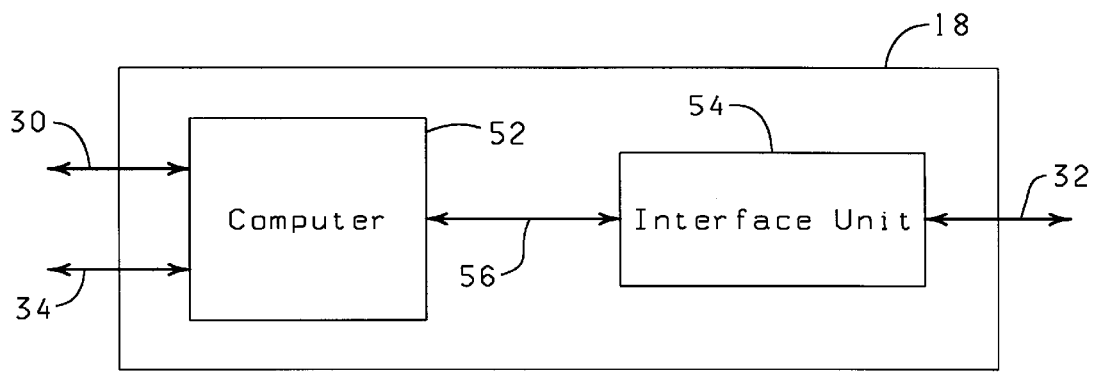

US 6,594,643 B1

AUTOMATIC STOCK TRADING SYSTEM

CROSS REFERENCE TO RELATED APPLICATIONS

This patent application is a continuation-in-part of U.S. Ser. No. 08/970,769 filed Nov. 14, 1997, now abandoned, which is hereby incorporated herein by reference.

STATEMENT REGARDING FEDERALLY SPONSORED RESEARCH OR DEVELOPMENT

Not Applicable.

BACKGROUND OF THE INVENTION

The trading of investment items, such as stocks and bonds is well known in the art. To aid investors, there are a number of data sources available for providing investment data to the investor. Also, there are a number of on-line investment trading systems today in which a trade request can be sent via a computer to a trader, and a traded product confirmation can be transmitted back from the trader to the computer. For example, one such system is offered by the Charles Schwab Company. Further, there are many commercially available investment item analysis programs or algorithms which analyze investment items including stocks, options, metals, and commodities.

However, to Applicant's knowledge, a system for automatically executing a trade by receiving investment data and analyzing such investment data with predetermined trading criteria and then sending a trade request to a trader and/or an exchange is not currently available. It is to such a system for automatically executing trades that the present invention is directed.

SUMMARY OF THE INVENTION

The present invention relates to a system for automatically trading investment items based on predetermined conditions. The investment items could be stocks, options, contracts, metals, and/or a number of other investment items, for example.

The system includes a data interface for receiving investment data identifying at least one item capable of being traded and containing information uniquely associated with the item. An individual trading computer receives predetermined trading criteria for making a trade, and the investment data. The individual trading computer then analyzes the investment data with the predetermined trading criteria and automatically outputs a trade request signal in response to the analysis determining that the item should be traded. The trade request signal identifies at least one trade of an item to be made by a trader and authorizes the trader to make the trade identified in the trade request so that at least a portion of the trade identified in the trade request signal is capable of being consummated. Thus, the present invention provides a fully automated investment trading system in which an entity such as a person or computer can input investment data and predetermined trading criteria into the system and then leave the system unattended to trade real investment items for extended periods of time such as hours, days or weeks.

The present invention solves at least three problems of manual trading. The first problem relates to discipline. That is, for psychological reasons the requirement for matching the exact criteria for a trade is overwhelming difficult when trading manually. Automatic trading eliminates this difficulty. The second problem is human error. That is, it is preferable that a close watch of market data for a number of indications be exactly maintained. However, factors such as boredom, interruptions, misreadings, etc. lead to poor or losing trade executions. The third problem relates to the fact that market conditions gradually change and require criteria or algorithm methodology alterations. This difficulty is virtually impossible to detect when trading manually. The present invention permits the individual trading computer to maintain a close watch on market data by the data interface periodically receiving investment data. The individual trading computer can analyze the investment data with the predetermined trade criteria and then send a trade request signal to a trader in response to the analysis determining that one or more items should be traded to overcome the before mentioned problems of manual trading.

Thus, it is believed that the present invention represents an advance in the state of the art relating to investment systems. Other objects, features and advantages of the present invention will become apparent to those of ordinary skill in the art upon a reading of specification in conjunction with the attached drawings and appended claims.

BRIEF DESCRIPTION OF THE SEVERAL VIEWS OF THE DRAWINGS

FIG. 3 is a schematic, diagrammatic view of an automatic individual trading computer adapted to function in the system depicted in FIG. 1.

FIG. 4 is a schematic, diagrammatic view of a trading interface adapted to operate in the system depicted in FIG. 1.

DETAILED DESCRIPTION OF THE INVENTION

Figure 1:
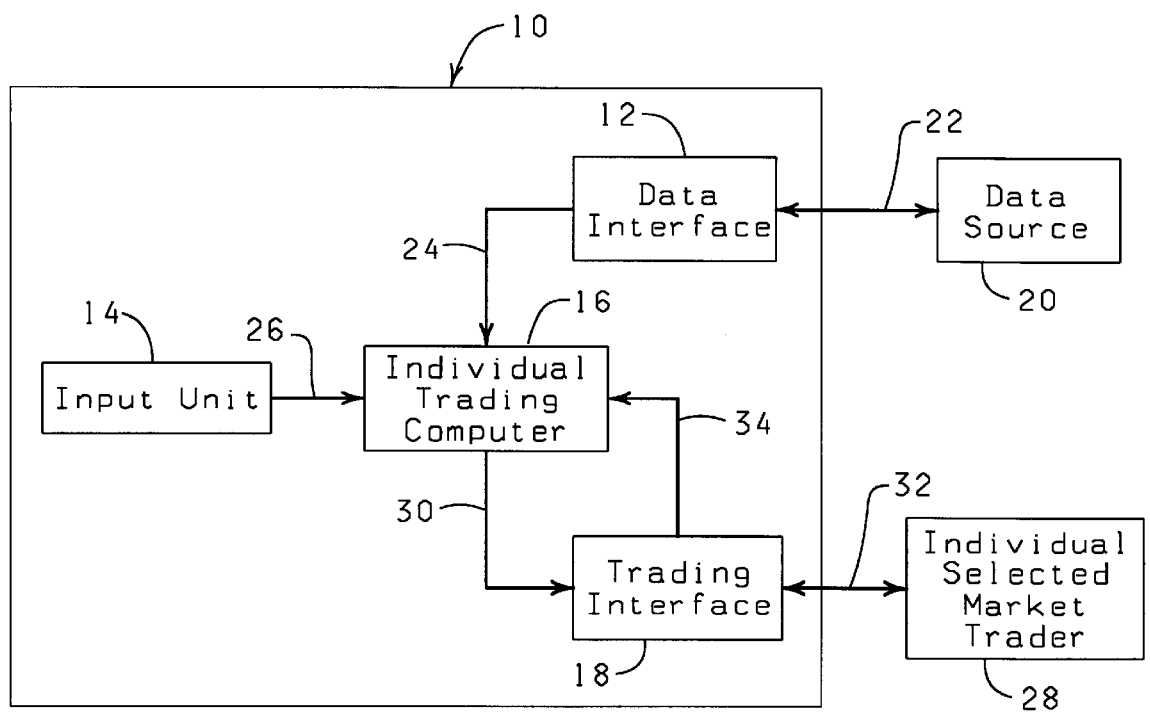
FIG. 1 is a schematic, diagrammatic view of a system for automatically trading investment items operating in accordance with the present invention.

Referring now to the drawings, and more particularly to FIG. 1, shown therein and designated by the general reference numeral 10 is an automated investment trading system constructed in accordance with the present invention. The automated investment trading system 10 basically comprises a data interface 12, an input unit 14, an individual trading computer 16, and a trading interface 18.

The individual trading computer 16 is an open architecture system which is designed to be publicly available and utilized by individual investors to automatically manage the individual's portfolio (e.g. place buy and sell orders of real investment items such as stocks or bonds) based on predetermined criterion entered into the individual trading computer 16 by an individual via the input unit 14.

The data interface 12 is capable of interfacing either simultaneously or not simultaneously with a plurality of individual selected data sources 20, only one of which is shown in FIG. 1 for purposes of clarity. The data interface 12 receives investment data identifying at least one real item capable of being traded and containing information uniquely associated with such item from the individual selected data source(s) 20 via a communication link 22. The investment data can be recent or historical stock or investment item price data, company financial data, commodity price data, interest rate data, consumer price index data, or any other data relevant to the evaluation of investing in the item. The item can be stocks, bonds, contracts, options, metals, real estate, or any other type of tangible or intangible property which can be bought or sold and/or otherwise invested in by an entity, such as an individual. The individual selected data source(s) 20 is selected by the individual manipulating the individual trading computer 16 from a plurality of data sources, such as Charles Schwab, Data Broadcast Company, an investment item exchange, a data base, or any other suitable source of investment data. The communication link 22 can be cable communications, air way communications or any other suitable transmission link.

The investment data is transmitted from the data interface 12 to the individual trading computer 16 via a communication link 24. The individual trading computer 16 receives the investment data transmitted by the data interface 12. The individual trading computer 16 also receives predetermined trading criteria for making a trade from the input unit 14 via a communication link 26.

The predetermined trading criteria include instructions, such as buy and sell orders, or algorithms capable of being used to analyze investment data to generate a trade request to buy and/or sell one or multiples of an investment item or products. For example, the predetermined trading criteria can be an instruction to buy and/or sell a stock at a predetermined price. In addition, multiple instructions (predetermined trading criteria) can be entered into the individual trading computer 16 to form a trading sequence relating to the same or different investment items. For example, a predetermined trading criterion to buy 100 shares of a stock at $50.00 and another predetermined trading criterion to subsequently sell the 100 shares of the same stock at $55.00 can be entered into the individual trading computer 16 before the predetermined trading criterion to buy the 100 shares of stock at $50.00 has been executed. The predetermined trading criteria can then be sequentially executed if the stock's market price drops to $50.00 and then rises from $50.00 to $55.00. The algorithm can be any algorithm and/or program capable of analyzing investment data to produce the trade request, such as a commercially available investment algorithm.

The input unit 14 can be a keyboard, a modem, a disk drive, or any other device capable of supplying predetermined trading criteria to the individual trading computer 16. The input unit 14 can be located in close proximity to the individual trading computer 16.

After the individual trading computer 16 receives the investment data, and the predetermined trading criteria or criterion, the individual trading computer 16 automatically analyzes the investment data with at least one of the predetermined trading criteria. In response thereto, the individual trading computer 16 generates the trade request and automatically outputs a trade request signal to an individual selected market trader 28 with no manual intervention in response to the analysis determining that the item should be traded. The trade request signal identifies at least one trade of an item to be made by the individual selected market trader 28 and authorizes the individual selected market trader 28 to make the trade identified in the trade request signal via a communication link 30. The trade request typically identifies at least one investment item and includes a product quantity and a predetermined trade price or market order conditioned to specifically identify all predetermined parameters or conditions necessary (such as long or short positions) to authorize the individual selected market trader 28 to make the trade identified in the trade request signal.

The trading interface 18 receives the trade request signal output by the individual trading computer 16. In response thereto, the trading interface 18 formats the trade request signal to a format understandable by the individual selected market trader 28 and then outputs the formatted trade request signal to the individual selected market trader 28 via a communication link 32. The communication link 32 can be a cable and/or air wave communications and/or any other suitable transmission link.

The individual selected market trader 28 receives the formatted trade request signal and in response thereto, the individual selected market trader 28 executes at least a portion of the trade. The individual selected market trader 28 is separate and apart from the individual trading computer 16. The individual selected market trader 28 can be anyone or anything that causes at least a portion of the trade to be consummated desirably on at least one trade exchange. The individual selected market trader 28 is selected by the individual from a plurality of potential traders, which may be Internet traders such as E-trade, Ameri-trade, Instinet, or Charles Schwab. The individual selected market trader 28 can be a company, an individual and/or a securities market, such as the New York Stock Exchange, the Pacific Stock Exchange, the Midwest Stock Exchange, the NASDAQ Stock Exchange, the over the counter market, the futures market, and/or the commodities market, for example.

Once the individual selected market trader 28 has executed the trade request signal, either partially or in whole, the individual selected market trader 28 outputs a trade confirmation signal to the trading interface 18 via the communication link 32. The trading interface 18 receives the trade confirmation signal output by the individual selected market trader 28, and in response thereto, the trading interface 18 outputs the trade confirmation signal to the individual trading computer 16 via a communication link 34. The individual trading computer 16 receives the trade confirmation signal transmitted by the trading interface 18, and in response thereto, the individual trading computer 16 may modify the predetermined trading criteria in a predetermined manner. For example, if the trade confirmation only showed that 25% of the investment items included in the trade request signal had been traded, then the individual trading computer 16 may decrease the number of investment items to be traded in the predetermined criteria by a predetermined amount of about 25%.

Moreover, when more than one predetermined trading criterion has been entered into the individual trading computer 16 for the same investment item and the predetermined trading criteria are indicated to be executed in a predetermined order, the trade confirmation signal indicating that one of the predetermined trading criteria has been executed will automatically activate the monitoring of the other predetermined trading criterion by the individual trading computer 16. For example, a predetermined trading criterion to buy 100 shares of a stock at $50.00 and another predetermined trading criterion to subsequently sell the 100 shares of the same stock at $55.00 can be entered into the individual trading computer 16 before the order to buy the 100 shares of stock at $50.00 has been executed. Once the trade confirmation signal indicates that the 100 shares of stock have been bought, the individual trading computer 16 is activated to monitor in real time the price of the stock so that the predetermined trading criterion to sell the stock at $55.00 can be automatically executed if the stock's market price rises to $55.00.

Figure 2:
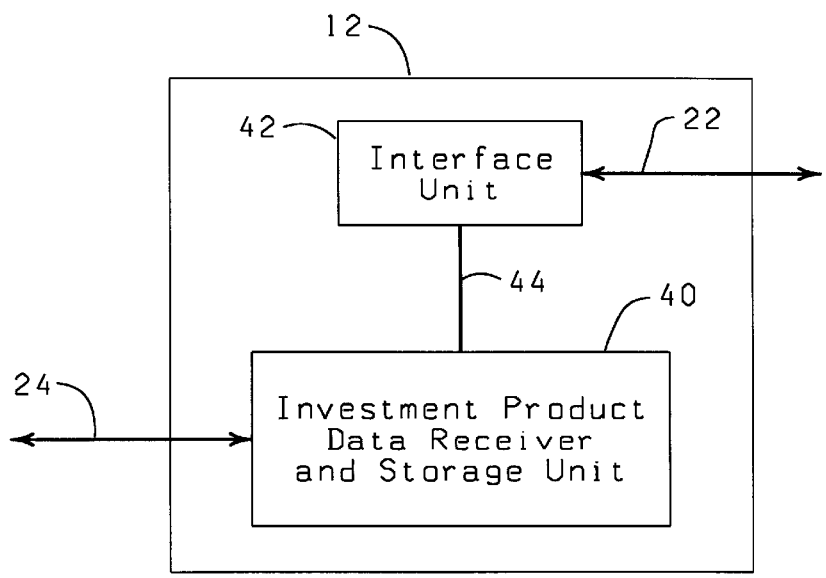
FIG. 2 is a schematic, diagrammatic view of a data interface adapted to operate in accordance with the system depicted in FIG. 1.

The data interface 12 is shown in more detail in FIG. 2. The data interface 12 basically comprises an investment item data receiver and storage unit 40 which receives signals from an interface unit 42 via a communication link 44. The investment item data receiver and storage unit 40 can be a model M1365117T obtainable from Data Broadcast Corporation. The interface unit 42 can be a receiver antenna and the data source(s) 20 can be a local radio station which receives real time investment item quotes from a satellite station (not shown) sent from an investment item exchange, for example. In one embodiment, the investment item data receiver and storage unit 40 can receive real time investment item data on all investment items listed at investment item trading exchanges all over the world, but the investment item data receiver and storage unit 40 only stores the data from predetermined investment item provided to the investment item data receiver and storage unit 40 from the individual trading computer 16. The investment item data receiver and storage unit 40 transmit the stored investment data identifying at least one investment item capable of being traded and containing information uniquely associated with such investment item to the individual trading computer 16 via the communication link 24 when a request for a stored data signal is sent to the investment item data receiver and storage unit 40 from the individual trading computer 16. The request for data signal is typically sent four to ten times a minute from the individual trading computer 16 and the investment item data stored in the investment item data receiver and storage unit 40 is usually updated at a frequency of about five to twenty times per minute from the data source(s) 20.

The individual trading computer 16 is shown in more detail in FIG. 3. The individual trading computer 16 includes a computer 46 which receives investment data from a data broadcast interface unit 48 via a communication link 50 and the predetermined trading criteria from the input unit 14 via the communication link 26. The computer 46 can be a personal computer, such as Packard Bell model 2010 or a Macintosh obtainable from Apple Computer or a personal data assistant. The data broadcast interface unit 48 can be software obtainable from Data Broadcast Corporation which is running on the computer 46. The computer 46 is programmed to analyze the investment item data with the predetermined trading criteria to generate the trade requests, as discussed above with reference to FIG. 1. In addition, the computer 46 is programmed to determine the value of an investment item portfolio owned by the individual and stored by the computer 46 of the individual trading computer 16 in real time (every investment item data retrieval cycle). The investment item portfolio can include information regarding investment items which are maintained in several different investment item accounts. For example, the individual may have accounts with several different individual selected market traders 28, such as E-Trade, Charles Schwab and Ameri-trade. The individual trading computer 16 can then automatically determine the amount of gain or loss of the investment item portfolio based on the latest trade confirmation data received by the computer 46 over the communication link 34. The results of these computations can be used as part of the predetermined trading criteria supplied by the input unit 14.

Moreover, the individual trading computer 16 is capable of obtaining information from more than one individual selected data source(s) 20, and outputting trade request signals to more than one individual selected market trader 28. The determination of which individual selected market trader 28 the individual trading computer 16 transmits the trade request signal to can be made by the individual and input as part of the predetermined trading criterion, or be automatically made by the computer 46 based on predetermined criterion stored therein, such as the differences in fee schedules between the individual selected market traders 28. The individual trading computer 16 can be programmed to select the individual selected market trader 28 so as to minimize the costs of submitting the trade request signal (i.e. buying or selling investment items). The individual trading computer 16 maintains all of the information regarding the individual's investment item portfolio, the predetermined trading criterion, the identity of the individual selected data source(s) 20, and the identity of the individual selected market trader(s) 28 private.

Referring now to FIG. 4, the trading interface 18 is shown in more detail. The trading interface 18 basically includes a computer 52 which communicates with an interface unit 54 via a communication link 56. The computer 52 can be a Packard Bell model 2010, and the interface unit 54 can be a modem. The computer 52 can be programmed with a trading exchange program, such as "street smart" obtainable from the Charles Schwab Company to receive trade requests and then output such trade requests to the individual selected market trader 28.

The present invention also contemplates the individual trading computer 16 monitoring the prices of each of the investment items contained in the investment item portfolio owned by the individual and stored by the individual trading computer 16. The input unit 14 receives predetermined trading criteria including a predetermined stop loss value for the item from the individual. The predetermined stop loss value can be a predetermined amount, e.g. $5/share, or a percentage of the value of the item.

The data interface 12 periodically receives pricing data from the individual selected data source 20 selected by the individual. The pricing data identifies at least one item capable of being traded and contains a price information uniquely associated with the item.

The computer 46, which is in communication with the data interface 12 and the input unit 14, has a reference to the item stored thereon. The computer 46 automatically monitors, in real time, the price of the item via the pricing data and changes an execution price of the moving stop loss in a first direction as the price of the item changes in the first direction and maintains the execution price of the moving stop loss as the price of the item changes in a second direction opposite from the first direction.

The computer 46 automatically outputs, in real time, a trade request signal to the individual selected market trader 28 selected by the individual in response to the price of the item changing in the second direction to the execution price of the moving stop loss. The trade request signal identifies at least one trade of the item to be made by the individual selected market trader 28 and authorizes the individual selected market trader 28 to make the trade identified in the trade request signal whereby at least a portion of the trade identified in the trade request signal is capable of being consummated.

Figure 5:
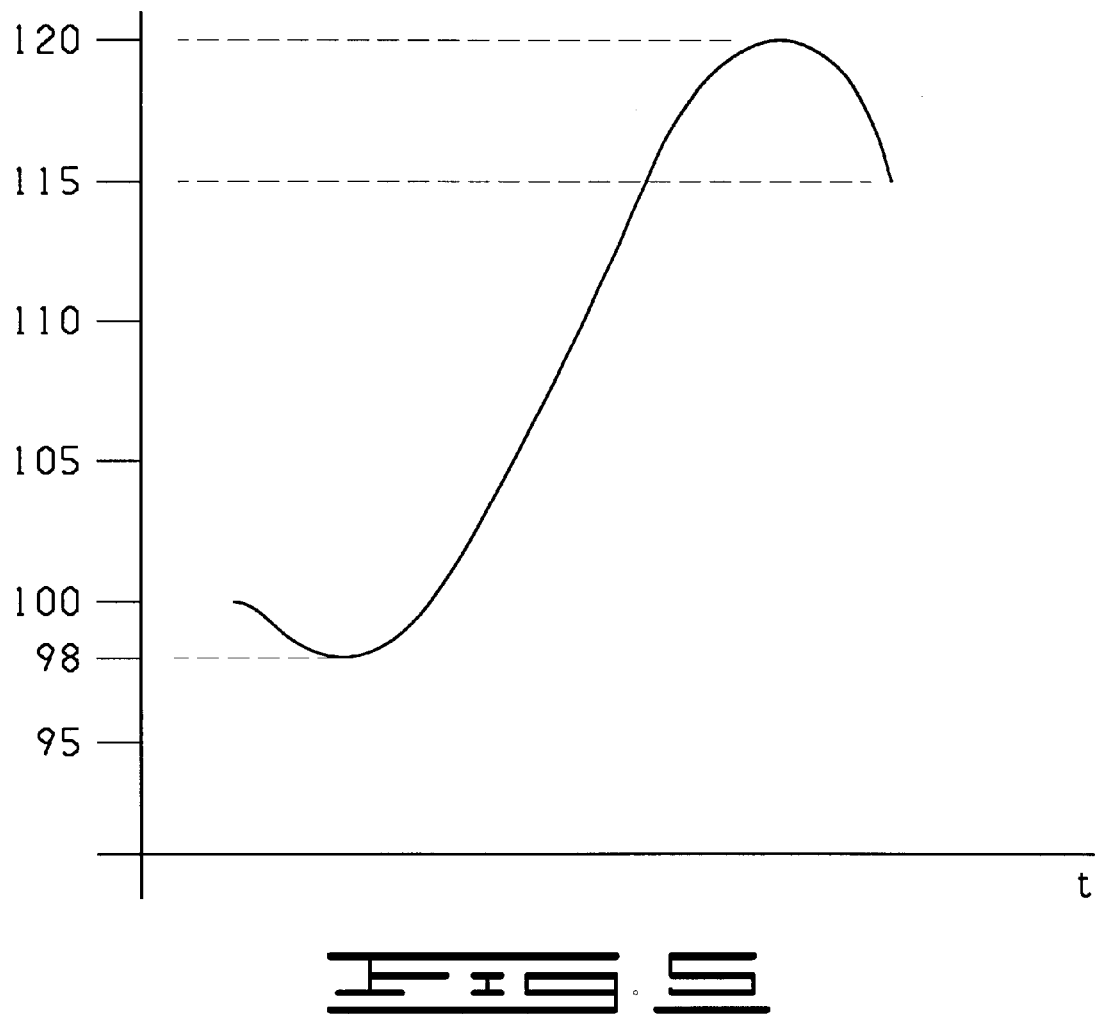
FIG. 5 is a price/share chart of a stock for XYZ company to illustrate the individual trading computer being programmed with a moving stop loss in accordance with the present invention.

For example, a price/share chart of a stock for XYZ company (hereinafter referred to as "XYZ stock") is shown in FIG. 5. Assuming that the XYZ stock was bought at $100/share, and the predetermined stop loss value was $5/share, the execution price of the moving stop loss would be initially set at $95/share. If during a first period, the price of the XYZ stock decreases to $98/share, then the execution price of the moving stop loss is maintained, and the moving stop loss would not be activated. If the price/share of the XYZ stock increased from $98/share to $120/share, the execution price of the moving stop loss would be increased in real time to $115/share. If the price/share of the XYZ stock decreased from the peak shown in FIG. 5 ($120/share) to $115/share, the moving stop loss would activate the individual trading computer 16 to output a trade request signal to sell all or a preselected part of the XYZ stock.

It should be noted that the computer 46 of the individual trading computer 16, and the computer 52 of the trading interface 18 can be the same physical computer. In this embodiment, programs embodying the logic of the individual trading computer 16, and the trading interface 18 can be programmed onto the same computer. The trade request may then be forwarded from the individual trading computer logic to the trading interface logic via a macro program. The macro program may include a trade confirmation loop which waits and captures the quantity and price of any investment item which has been traded (the trade confirmation signal) and to forward such trade confirmation signal to the individual trading computer logic via the communication link 34. It should be understood by those of ordinary skill in the art that in this embodiment, the communication links 30 and 34 would exist as logical links between the two computer programs.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An individual trading computer for automatically trading investment items, the individual trading computer comprising:

an input unit receiving predetermined trading criteria including a predetermined stop loss value for the item from an individual;

a data interface periodically receiving pricing data from an individual selected data source selected by the individual, the pricing data identifying at least one item capable of being traded and containing a price information uniquely associated with the item; and a computer in communication with the data interface and the input unit, the computer having a reference to the item stored thereon, the computer automatically monitoring the price of the item via the pricing data and changing an execution price of a moving stop loss in a first direction as the price of the item changes in the first direction and maintaining the execution price of the moving stop loss as the price of the item changes in a second direction opposite from the first direction, the computer automatically outputting a trade request signal to an individual selected market trader selected by the individual in response to the price of the investment item changing in the second direction to the execution price of the moving stop loss, the trade request signal identifying at least one trade of the item to be made by the individual selected market trader and authorizing the individual selected market trader to make the trade identified in the trade request signal whereby at least a portion of the trade identified in the trade request signal is capable of being consummated.

2. The individual trading computer of claim 1, wherein the input unit, data interface and computer are all provided as components on a single physical computer.

3. The individual trading computer of claim 1, wherein the computer outputs trade request signals to more than one individual selected market trader, and an investment item portfolio is stored on the computer, the investment item portfolio including a first investment item maintained in an account by one individual selected market trader, and a second investment item maintained in an account by another individual selected market trader.

4. The individual trading computer of claim 3, wherein the investment item portfolio stored on the computer is maintained confidentially.

* * * * *

UNITED STATES PATENT AND TRADEMARK OFFICE
CERTIFICATE OF CORRECTION

| | | |
|---|---|---|
| PATENT NO. | : 6,594,643 B1 | Page 1 of 1 |
| APPLICATION NO. | : 09/451643 | |
| DATED | : July 15, 2003 | |
| INVENTOR(S) | : Charles C. Freeny, Jr. | |

It is certified that error appears in the above-identified patent and that said Letters Patent is hereby corrected as shown below:

On the title page, item (56), under the heading "References Cited, U.S. Patent Documents", insert the following U.S. Patents:

| | | | |
|---|---|---|---|
| --5,787,402 | 07/1998 | Potter, et al. | 707/37 |
| 5,033,804 | 07/1991 | Faris | 312/223.3 |
| 5,758,324 | 05/1998 | Hartman, et al. | 705/1 |
| 5,802,314 | 09/0998 | Tullis, et al. | 709/246-- |

On the title page, item (56), under the heading "References Cited, Other Publications", insert the following publications:

--"Wireless Trading - Schwab cuts the electronic cord with PocketBroker™ and Palm™"; Schwab Active Trader; ON INVESTING, Summer 2000; AT5-AT6.

"CyberCorp-the leading edge of active-trading technology joins the Charles Schwab Corporation"; Schwab Active Trader; ON INVESTING, Summer 2000; AT7.

"Briefings - Quick tips to help you use Schwab more effectively"; Schwab Active Trader; ON INVESTING; Summer 2000; pg. 52.--

Signed and Sealed this

Twentieth Day of February, 2007

JON W. DUDAS
*Director of the United States Patent and Trademark Office*